Jan. 12, 1943.  T. G. SCHMEISER  2,308,110
BEARING ASSEMBLY
Filed Oct. 20, 1941  2 Sheets—Sheet 1

INVENTOR.
T. G. Schmeiser
BY
ATTORNEYS

Jan. 12, 1943.  T. G. SCHMEISER  2,308,110
BEARING ASSEMBLY
Filed Oct. 20, 1941   2 Sheets-Sheet 2

INVENTOR.
T. G. Schmeiser
BY
ATTORNEYS

Patented Jan. 12, 1943

2,308,110

UNITED STATES PATENT OFFICE 2,308,110

BEARING ASSEMBLY

Theodore G. Schmeiser, Fresno, Calif.

Application October 20, 1941, Serial No. 415,716

12 Claims. (Cl. 308—187.1)

This invention relates in general to an improved bearing assembly, and in particular is a continuation in part of my copending application, Serial No. 334,805, filed May 13, 1940, U. S. Patent No. 2,262,654; the principal object of the instant invention being to provide a heavy duty bearing assembly which comprises few parts which are easily assembled into a unit requiring little attention when in use.

It is also an object of the invention to provide a bearing assembly which is dust proof and especially suited for use in connection with agricultural implements, such as the roller type soil cultivator and packer shown in my copending application, Serial No. 388,257, filed April 12, 1941, U. S. Patent No. 2,288,110. However, the invention may be used for such other purposes as it may be suited.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
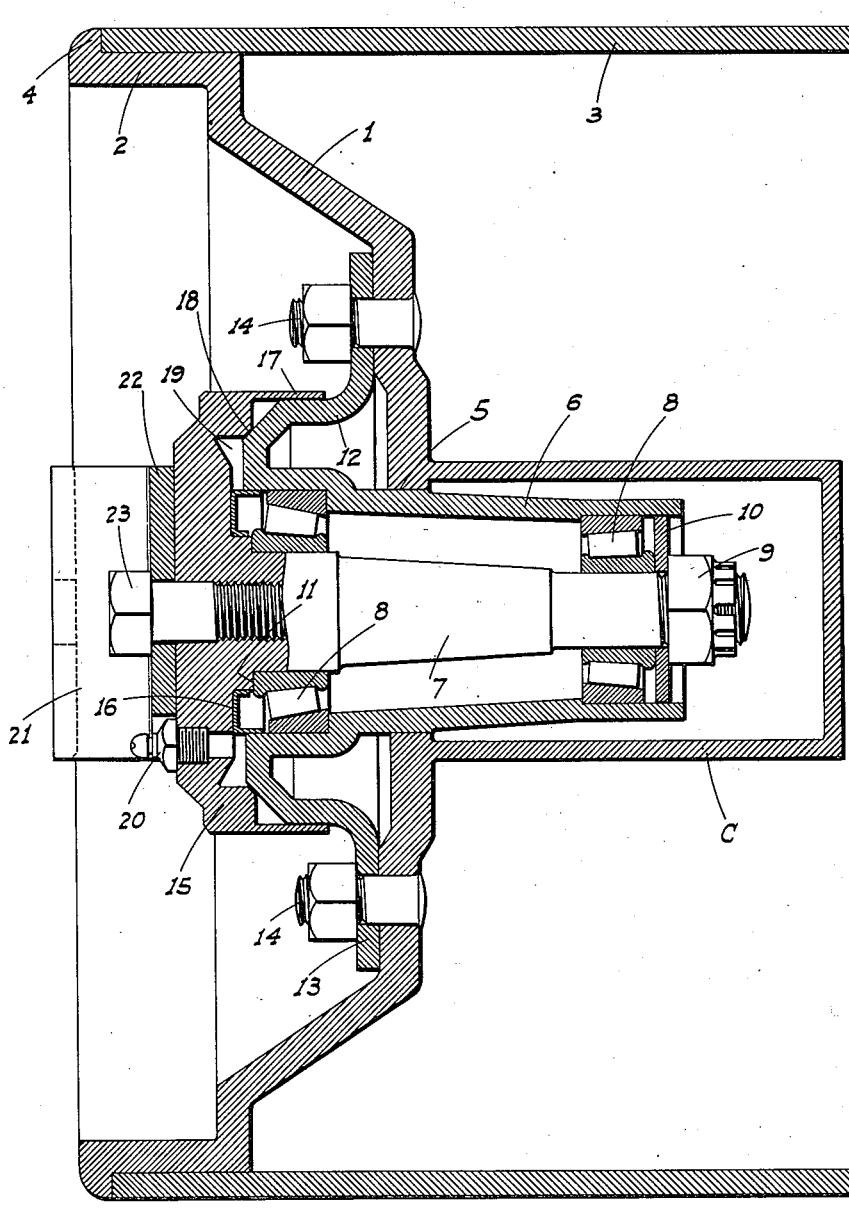
Figure 1 is a sectional elevation of one form of the invention.

Referring now more particularly to the characters of reference on the drawings, and at present to the bearing assembly shown in Fig. 1, the numeral 1 indicates a dished or concave head formed about its periphery with an integral annular band 2 adapted to engage or telescope into the open end of a tubular rotary member 3 such as a ground roller or the like; such band having a radial stop bead 4 projecting outwardly therefrom and engaging the end of member 3. The band 2 is affixed to member 3 in suitable manner, as by welding.

The concaved head 1 is formed with a central circular opening 5 through which a tubular housing 6 projects axially, said housing frictionally engaging intermediate its ends in opening 5 and in centered relation to head 1. Inwardly of head 1 the projecting portion of housing 6 is surrounded and enclosed by a cylindrical cap C formed with said head about opening 5 and extending axially inward therefrom.

A spindle 7 is mounted in housing 6 and is carried adjacent the ends of the housing in conventional roller bearings 8; the inner wall of said housing being recessed to receive said roller bearings in seated relation. A lock nut 9 is threaded on the inner end of spindle 7 and abuts a retaining washer 10 for the adjacent bearing 8. The other bearing 8 is held in place by a shoulder 11 formed in the spindle adjacent its outer end.

At its outer end, the housing 6 is formed with an inwardly extending annular bell 12 which, at its inner periphery, merges with an integral annular flange 13 projecting radially outward; said flange seating against the bottom of head 1 and being attached thereto by circumferentially spaced bolts 14.

A radially enlarged head 15 is formed on spindle 7 at its outer end and overlies bell 12; there being an annular seal 16 between head 15 and the adjacent roller bearing 8, such seal seating in the open end of housing 6. The head 15 includes an inwardly and axially projecting flange 17 which overhangs the bell 12 with a close running fit to form a dust shield, and in addition the head may bear against the bell as at 18 to provide a further dust seal. Radially inwardly of seal 18 there is an annular pocket 19 into which heavy grease may be injected through a fitting 20 to further assure against dust entry.

A mounting bracket 21 having an inwardly offset portion 22 is secured to the exterior of enlarged head 15 by an attachment bolt 23; this bracket being adapted to be secured to a supporting frame (not shown).

Figure 2:
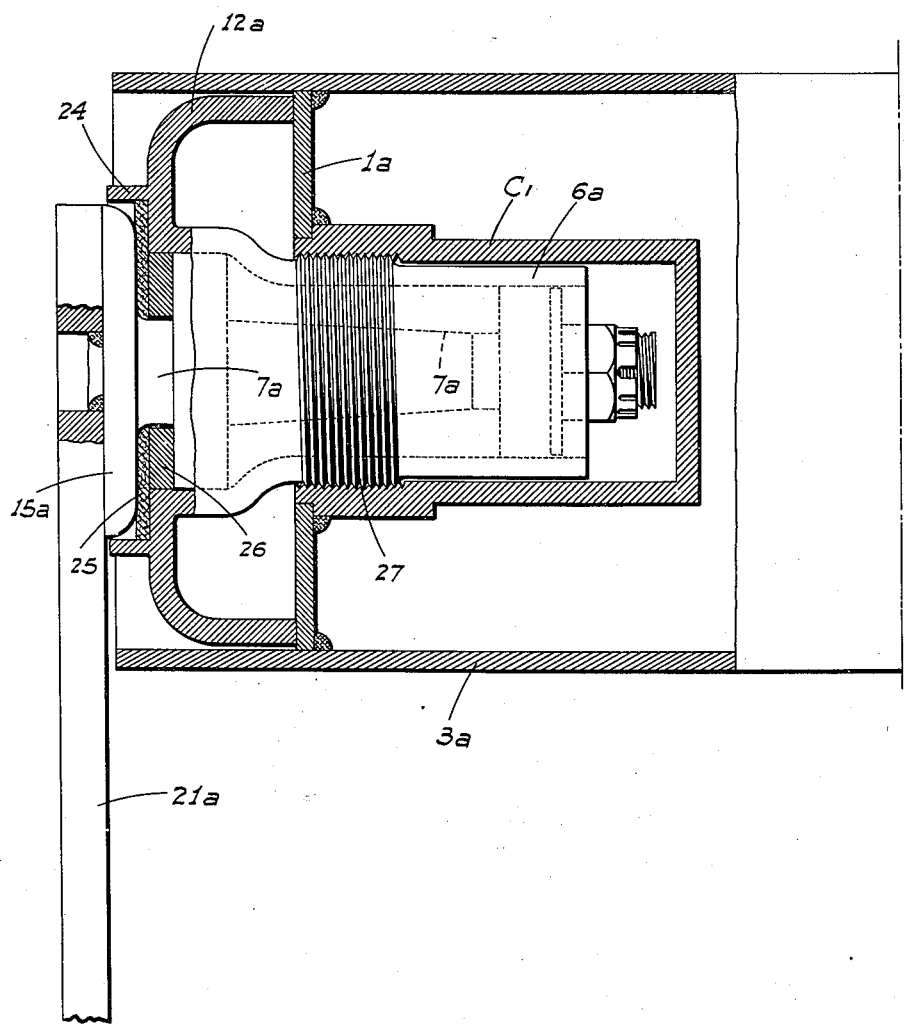
Figure 2 is a sectional elevation of a modified form of the invention.

In the embodiment of Fig. 2, the housing 6a is mounted on a spindle 7a in substantially the same manner as described in connection with Fig. 1, except that here the enlarged head 15a on the spindle includes no flange or skirt overhanging the bell 12a. Instead an annular flange 24 projects axially outward from said bell in closely surrounding relation to head 15a. A sealing washer 25, of substantially the same diameter as the inside diameter of annular flange 24, surrounds the spindle and is engaged between head 15a and the adjacent end of the housing 6a and a sealing or holding ring 26 which engages the end of the adjacent roller bearing 8. The supporting arm or bracket 21a is attached to head 15a and extends radially therefrom beyond the end of the supported tubular member 3a.

A cylindrical cap C—1 engages over housing 6a with a snug fit from the end thereof adjacent the free end of the spindle 7a, and such cap adjacent its open end is threaded onto housing 6a, as at 27. An annular and radial head 1a, having a central opening is fitted in tubular rotary member 3a adjacent but inwardly from one end thereof and is welded in place. The cap C—I projects axially into the head opening from the rear and the cap and head are fixed together as by welding.

The bell 12a on the outer end of housing 6a is of a diameter only slightly less than the inside diameter of member 3a and the free end or peripheral edge of this bell engages head Ia whereby to limit threading engagement of housing 6a into cap C—I, and to stabilize the entire bearing assembly in relation to member 3a.

From the foregoing description it will be readily seen that I have produced such a device as substantially fulfills the objects of the invention as set forth herein.

While this specification sets forth in detail the present and preferred construction of the device, still in practice such deviations from such detail may be restorted to as do not form a departure from the spirit of the invention, as defined by the appended claims.

Having thus described my invention, what I claim as new and useful and desire to secure by Letters Patent is:

1. A bearing assembly for apparatus which includes a tubular rotary member, and a support disposed at one end thereof, said assembly comprising a spindle fixed in connection with said support and projecting axially into the tubular member from said end, a cylindrical housing turnably mounted on the spindle, a head fitted in said end of the tubular member, said head having a central circular recess, the spindle housing projecting into said recess, and engaging therein in locating relation, and means rigidly connecting the spindle housing and head in removable relation; said means comprising a bell on the outer end of the spindle housing facing said head, a radial flange on the bell, said flange engaging the head in face to face relation, and bolts securing the flange and head together.

2. A device as in claim 1 including a radially enlarged head on the spindle outwardly of the bell, and an annular skirt extending axially inward in surrounding relation to said bell and with a close running fit whereby to provide a dust shield.

3. A device as in claim 1 including a radially enlarged head on the spindle outwardly of the bell, and an annular skirt extending axially inward in surrounding relation to said bell and with a close running fit whereby to provide a dust shield; there being an annular pocket between said head and bell, and a grease fitting through said head into said pocket.

4. A bearing assembly for apparatus which includes a tubular rotary member, and a support disposed at one end thereof, said assembly comprising a spindle fixed in connection with said support and projecting axially into the tubular member from said end, a cylindrical housing turnably mounted on the spindle, a head fitted in said end of the tubular member, said head having a central circular recess, the spindle housing projecting into said recess in centered and supported relation, and means rigidly connecting the spindle housing and head in removable relation; said means comprising a bell on the outer end of said spindle housing facing said head, and means releasably holding the inner edge of the bell engaging said head.

5. A bearing assembly for apparatus which includes a tubular rotary member, and a support disposed at one end thereof, said assembly comprising a spindle fixed in connection with said support and projecting axially into the tubular member from said end, a cylindrical housing turnably mounted on the spindle, a head fitted in said end of the tubular member, said head having a central circular recess, the spindle housing projecting into said recess, and engaging therein in locating relation, and means rigidly connecting the spindle housing and head in removable relation; the head being concave, and said means comprising a bell on the outer end of said spindle housing facing said head and seated in the concavity thereof, and means releasably holding the bell and head against relative separating movement.

6. A bearing assembly for apparatus which includes a tubular rotary member, and a support disposed at one end thereof, said assembly comprising a spindle fixed in connection with said support and projecting axially into the tubular member from said end, a cylindrical housing turnably mounted on the spindle, a head fitted in said end of the tubular member, said head having a central circular recess, the spindle housing projecting into said recess being threaded thereinto, and means to limit rotation of the spindle housing relative to said head in a threading-in direction.

7. A bearing assembly for apparatus which includes a tubular rotary member, and a support disposed at one end thereof, said assembly comprising a spindle fixed in connection with said support and projecting axially into the tubular member from said end, a cylindrical housing turnably mounted on the spindle, a head fitted in said end of the tubular member, said head having a central circular recess, the spindle housing projecting into said recess being threaded thereinto, and means to limit rotation of the spindle housing relative to said head in a threading-in direction; said means comprising an annular bell-like flange extending radially in fixed relation from the housing and seating on said head.

8. A bearing assembly for apparatus which includes a tubular rotary member, and a support disposed at one end thereof, said assembly comprising a spindle fixed in connection with said support and projecting axially into the tubular member from said end, a cylindrical housing turnably mounted on the spindle, a head fitted in said end of the tubular member, said head having a central circular recess, the spindle housing projecting into said recess being threaded thereinto, and means to limit rotation of the spindle housing relative to said head in a threading-in direction; said means comprising an annular bell-like flange extending radially in fixed relation from the housing and seating on said head, the diameter of said bell-like flange being substantially the same as the diameter of the head.

9. A bearing assembly for apparatus which includes a tubular rotary member, and a support disposed at one end thereof; said assembly comprising a spindle fixed in connection with said support and projecting axially into the tubular member from said end, a cylindrical housing turnably mounted on the spindle, a head fitted in said end of the tubular member, said head having a central circular recess, the spindle housing projecting into said recess, means rigidly but removably securing said housing and head together, a radially enlarged head on the spindle outwardly of the housing, and a sealing gasket between said spindle head and the spindle housing.

10. A device as in claim 9 in which the spindle housing includes an inwardly facing bell engaging the first named head, and an annular flange formed with and projecting axially outward in surrounding relation to said spindle head.

11. A device as in claim 9 in which the spindle housing includes an inwardly facing bell engaging the first named head, and an annular flange formed with and projecting axially outward in surrounding relation to said spindle head, the sealing gasket fitting snugly at its periphery in said annular flange.

12. A bearing assembly for apparatus which includes a tubular rotary member, and a support disposed at one end thereof, said assembly comprising a spindle fixed in connection with said support and projecting axially into the tubular member from said end, a cylindrical housing turnably mounted on the spindle, a head fitted in said end of the tubular member, said head having a central circular recess, the spindle housing projecting into said recess, means rigidly but removably securing said housing and head together, a radially enlarged head on the spindle at the outer end of the housing, and an annular flange formed rigid with said housing and projecting axially outward in closely surrounding relation to said enlarged head.

THEODORE G. SCHMEISER.